(12) United States Patent
Sornes

(10) Patent No.: US 6,283,767 B1
(45) Date of Patent: Sep. 4, 2001

(54) GROUNDING TERMINAL

(75) Inventor: Espen Sornes, Sandnes (NO)

(73) Assignee: Factor Tool AS, Stavanger (NO)

( * ) Notice: Subject to any disclaimer, the term of this patent is extended or adjusted under 35 U.S.C. 154(b) by 0 days.

(21) Appl. No.: 09/417,783

(22) Filed: Oct. 14, 1999

(30) Foreign Application Priority Data

Sep. 23, 1999 (NO) .............................................. 1999 4634

(51) Int. Cl.⁷ .................................................. H01R 4/66
(52) U.S. Cl. ................................ 439/39; 439/40; 439/100
(58) Field of Search ................................ 439/100, 38–40

(56) References Cited

U.S. PATENT DOCUMENTS

| 2,287,112 | 6/1942 | Lourie ..................................... 219/8 |
| 2,429,526 | 10/1947 | Savon ................................... 173/324 |
| 2,437,633 | 3/1948 | Abram ................................. 173/324 |
| 3,518,607 | * 6/1970 | Reel ........................................ 439/40 |
| 4,676,562 | 6/1987 | Adshead et al. ....................... 439/38 |

FOREIGN PATENT DOCUMENTS

| 1943544 | 4/1971 | (DE) . |
| 264312 | 1/1989 | (DE) . |
| 540690 | * 10/1941 | (GB) ..................................... 439/40 |
| 552378 | * 4/1943 | (GB) ..................................... 439/40 |

OTHER PUBLICATIONS

Page from catalogue of James Morton on Magnetic Ground Clamps as of May 23, 1999.

* cited by examiner

Primary Examiner—Gary F. Paumen
(74) Attorney, Agent, or Firm—Ladas & Parry

(57) ABSTRACT

It is described a grounding terminal for temporary fastening a grounding conductor to a construction to be welded. The grounding terminal uses permanent magnets, example given of neodymium (Nd—Fe—B-35) to fasten the terminal to the construction. A welder that uses the grounding terminal can by one grip easily scrape the contact surface of the construction free of paint, rust and oxide scale and thereafter fasten the grounding terminal to and unfasten it from the construction. Fastening and unfastening is based on relocation of the permanent magnets in such a way that an open and a closed magnetic loop respectively, are created.

14 Claims, 8 Drawing Sheets

FIG. 1  On

FIG. 3 Off

FIG. 4 Off

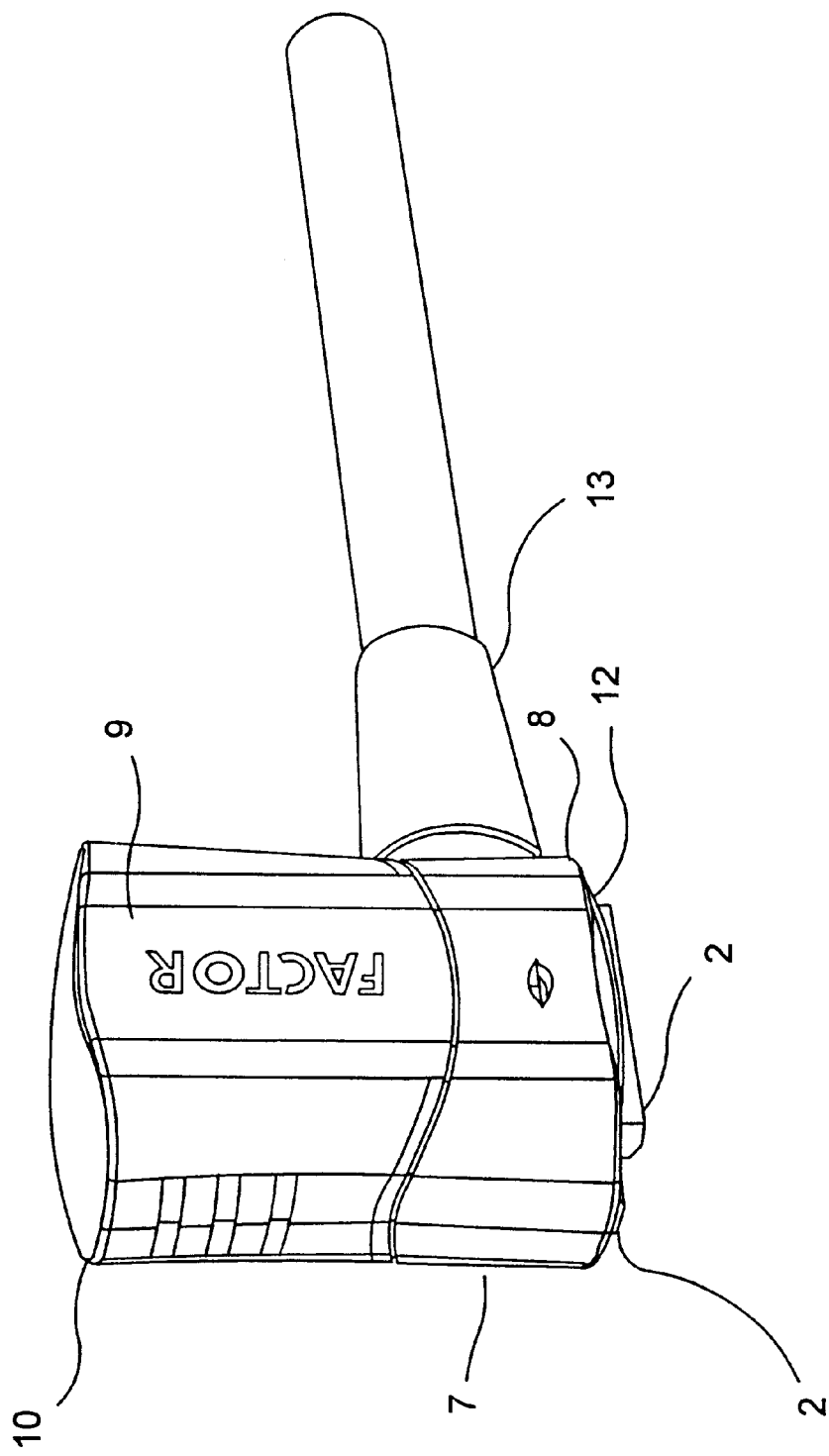

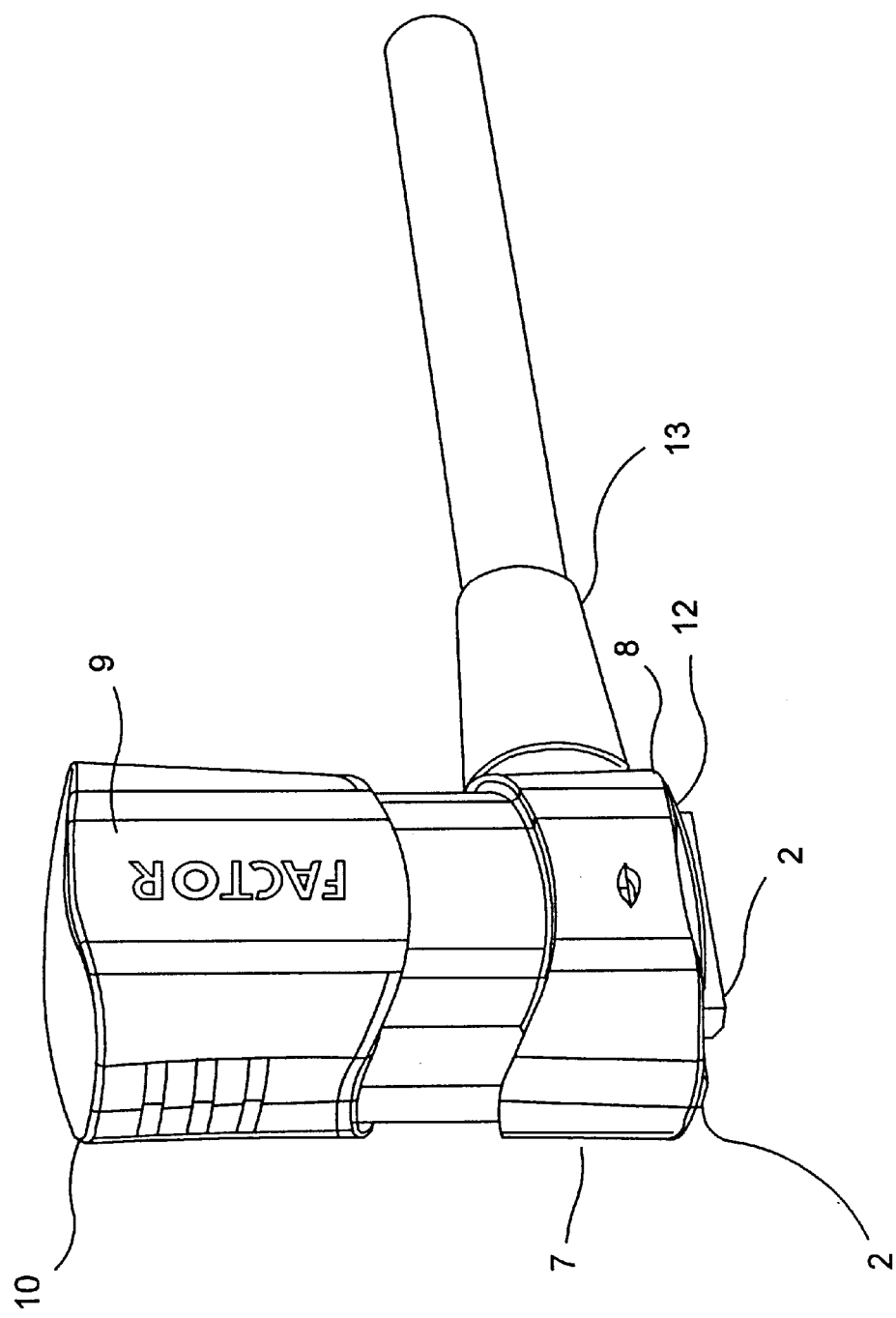
FIG. 8  Off

GROUNDING TERMINAL

TECHNICAL FIELD OF THE INVENTION

The invention concerns a grounding terminal for temporary connection of a grounding conductor to an object to be welded.

BACKGROUND OF THE INVENTION

By all welding a positive and a negative cable are used where the negative cable is the ground cable which is fastened to the construction to be welded. The welding is preformed by the positive cable to which an electrode holder or a feeding piston is mounted. To fasten the ground cable to the construction a grounding terminal is used.

Known grounding terminals comprise among other things earthing clamps, that grip over the construction, example given a pipe, by using a mechanical force providing electrical contact with the construction. However, earthing clamps can not be Fastened to all geometrical surfaces as they are dependent upon being able to grip around the object. The electrical connection is dependent upon the jaws of the earthing clamps gripping around the construction to give sufficient contact. The mechanical force is often provided by screws or mechanical springs. that after a while can get loose and thereby give poorer contact with the construction. If an earthing clamp is to be fastened on bigger constructions, an ear must first be welded to the construction to which the earthing clamp then can be fastened.

Other known grounding terminals are based on magnetism, and comprise as terminals with permanent magnets and terminals based on the use of electromagnets. Such grounding terminals can be used when the construction to be welded is made of a ferromagnetic material. For example, there are described in the patents U.S. Pat. No. 2,287,112 and U.S. Pat. No. 2,437,833 magnetic grounding terminals based on an electromagnet. When the current is switched on, the terminals are magnetized and the contact surface is drawn towards the workpiece. Electromagnetic grounding terminals must however have their own power supply and their own conductor from the power supply to the coil in the electromagnet of the terminal. Grounding terminals with permanent magnets are disclosed in U.S. Pat. No. 2,429,526 and U.S. Pat. No. 4,676,562. The grounding terminal in U.S. Pat. No. 4,676,562 is designed to be held and fastened by one hand. The terminal will however be hard to unfasten from the workpiece. James Mortem™ has also put on the market a magnetic grounding terminal based on permanent magnets. Known grounding terminals with permanent magnets have generally the disadvantage that the magnetic force can not be"turned off" in the way the current in an electromagnet can be turned off, or otherwise be moved away from the contact surface with the construction. These magnetic grounding terminals will in a typical industrial environment also attract metal shavings that fasten on the contact surface. This is highly unwanted as it will give poorer contact between the workplace and the grounding terminal.

To obtain a good ground connection between the grounding terminal and the workpiece to be welded, the contact surface on the construction must also be free of paint, rust and oxide scale. This is now done by using a separate scraper in some form. The welder must therefor be equipped with several tools during welding.

OBJECTS OF THE INVENTION

It is an object of the present invention to provide a grounding terminal which can be fastened on all magnetic constructions/workpieces to be welded independent of the geometry of the construction.

Another object of the invention is to provide a grounding terminal with only one conductor, the grounding conductor, and which also can activate and deactivate the magnetic force in the contact surface with the workpiece.

A third object of the invention is to provide a grounding terminal which can easily be fastened to and unfastened from the construction to be welded.

A fourth object of the present invention is to eliminate the need for extra equipment such as scrapers for scraping away rust, paint and oxide scale from the contact surface on the workpiece.

SUMMARY OF THE INVENTION

According to the invention the aforementioned objects above are achieved by a magnetic grounding terminal for temporary connection of a grounding conductor to an object to be welded. The grounding terminal is characterized in that it comprises permanent magnets, the permanent magnets having a first state for fastening the grounding terminal to the object and a second state for unfastening the grounding terminal from the object, the grounding terminal being arranged to be fastened and unfastened by one hand, the grounding terminal is fastened by pressing it towards the object to be welded and unfastened by pulling it away from the object to be welded.

The permanent magnets may be moveable between a first and a second position, representing the first and second state of the permanent magnets respectively.

Further, the grounding terminal may comprise a housing, two upper parallel extended metal plates and two or parallel extended metal plates in the housing, the permanent magnets are arranged between the metal plates and in the first position constitute an open magnetic loop together with the metal plates for fastening the grounding terminal to the object, and in the second position constitute a closed magnetic loop together with the metal plates for unfastening the grounding terminal from the object.

A magnet holder may be arranged between the metal plates, the magnet holder having an upper and a lower compartment for mounting of the permanent magnets, that are being constituted by an upper permanent magnet and a lower permanent magnet respectively. In the first position the lower permanent magnet is arranged between the two lower metal plates and the upper permanent magnet is arranged between the two upper metal plates, and in the second position the two permanent magnets are arranged between the two upper metal plates.

The house may be equipped with a handle, to which the upper part of the magnet holder is fixed, and movement of the handle then causes the alteration of position of the magnet holder and thereby the permanent magnets. The lower metal plates may provide contact surfaces for contact with the object to be welded. The metal plates may have a certain thickness providing defined end faces. The contact surfaces may then be constituted by the lower end faces of the two lower metal plates, and by a groove formed by the insides of the lower ends of the two lower metal plates, the groove facilitating the fastening of the grounding terminal on pipes and pipe constructions. In a preferred embodiment the insides of the lower ends of the lower metal plates have the form of opposite slanting faces, the faces slanting upwards in a direction towards each other. The groove may be milled out on the innermost part of the lower end faces of the metal plates.

It is preferred to use permanent magnets made of Neodymium, Nd—Fe—B-35.

The grounding terminal may also comprise scraping tools for scraping off rust, paint or oxide scale on the object, obtaining a better contact surface with the object. The scraping tool then having scraping knives being arranged protruding perpendicular outwards from the contact surfaces, but in such a way that the scraping tool does not affect the contact surfaces contact with the object. Then, the grounding terminal has a shape so that scraping off rust, paint and oxide scale on the object to be welded, and fastening of the grounding terminal to the object and unfastening the grounding terminal from the object, may be performed in successive operations by using one hand only and without changing the grip on the grounding terminal.

In a preferred embodiment the magnetic grounding terminal is also equipped with a quick release coupling for the grounding conductor so that this easily can be disconnected from the grounding terminal.

Measurements have been performed showing that the grounding terminal satisfies the requirements of sufficient grounding by ordinary welding without power loss in the transition resistor between cargo and earthing magnet causes overheating in the grounding terminal, and it may thereby replace a conventional grounding terminal. The grounding terminal does naturally only work on magnetic materials, and provides a safe grounding during welding on plane surfaces. By welding on large constructions and pipe dimensions it has quite unique advantages compared to conventional grounding tools, like grounding clamps, since welding, cutting and grinding of an attachment on the surface of the workpiece for the grounding clamp is avoided. The shape of the contact surfaces of the terminal do that it fits well on most dimensions, but of course it is dependent upon a fairly clean surface to obtain a proper ground connection. The exchangeable scraping knives function well on painted or rusty surfaces. meaning that burns and overheating of the grounding are eliminated. The built-in scraping knives do also solve the problem by having to use extra tools for cleaning the surface to obtain proper contact. As the grounding terminal also sticks well to the surface. the problem of a loose ground connection is eliminated. It is independent of external power supply, and therefore does not fall off by power failure, at the same time as an extra wire and switch are avoided.

BRIEF DESCRIPTION OF THE DRAWINGS

In the following embodiments, the invention will be further described with reference to the accompanying drawings, where FIG. 7 shows the intact grounding terminal in FIG. 1 in a first state for fastening the terminal to a construction, and FIG. 8 shows the intact grounding terminal in FIG. 1 in a second state for unfastening the terminal from a construction.

DETAILED DESCRIPTION OF THE PREFERRED EMBODIMENT OF THE INVENTION

Construction

Figure 1:
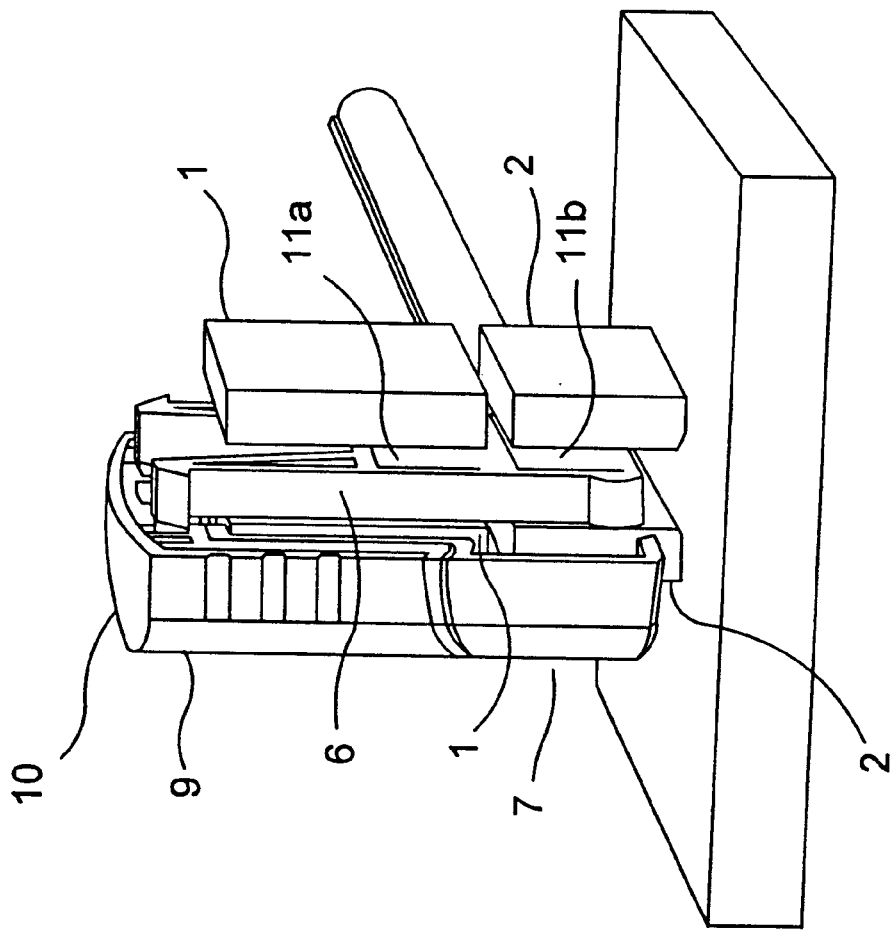
FIG. 1 shows an embodiment of the grounding terminal according to the invention, where a part of the housing is removed, and the terminal is in a first state for fastening to a construction.

Reference is made FIGS. 1–8 where the same reference numerals indicate the same elements on the different drawings.

Figure 5:
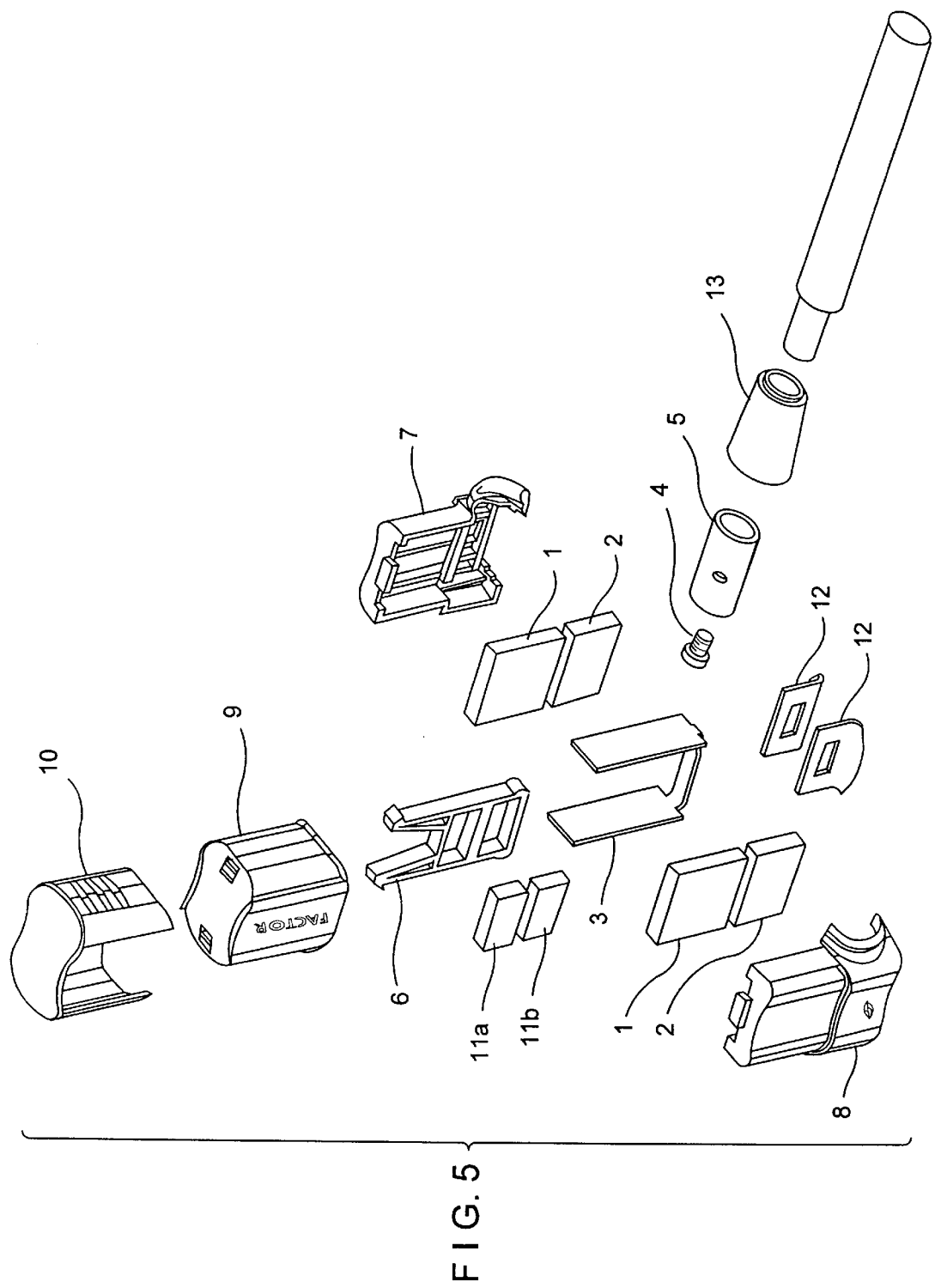
FIG. 5 is an exploded view of the grounding terminal in FIGS. 1–4.

FIG. 5 shows an exploded view of a grounding terminal according to the invention. Cover A7, cover B8, holder 9 and rubber grip 10 enclosing the holder 9, constitute the housing of the grounding terminal. Cover A and B is made of heat resistant plastic, and can be integrated in one part. and holder 9 with rubber grip 10 can in the same way be integrated in one part. The inside of the grounding terminal consists in a magnet holder 6 of heat resistant plastic, two upper and two lower metal plates 1 and 2 made of steel, noncorrosive spacing plate 3. and permanent magnets 11*a* and 11*b* of neodymium, Nd—Fe—B-35. The metal plates 1, 2 are of a certain thickness and thereby have both defined lateral surfaces and end faces. The grounding terminal also has a quick release coupling for connection of a negative conductor 14 to the terminal, the quick release coupling consisting in a noncorrosive bolt 4, quick release coupling in brass connected to the bolt 4, and a rubber cap 13 enclosing the quick release coupling.

The spacing plate 3 consists in two opposite parallel wall parts 3*a*, 3*b* spaced from each other, connected at their lower end by a bottom part 3*c*, shown in FIG. 5. The two upper and the two lower steel plates, 1 and 2 respectively, are of the same thickness, but the upper steel plate is longer than the lower steel plate. The two lower steel plates are accommodated on opposite sides of the spacing plate 3, and on the same opposite sides the upper steel plates are accommodated above the lower steel plates, but in such a way that the opposite end faces to a lower and an upper steel plate are parallel and in a distance from each other. Metal plates 1, 2 are arranged on such opposite sides of the spacing plate 3, that the metal plates 1, 2 and the spacing plate 3 constitute a space with an upper opening, the space being defined by the opposite metal plates 1 and 2, the wall parts 3*a*, 3*b* and the bottom part 3*c* of the spacing plate 3. The lower end faces of the lower steel plates constitute the contact surfaces of the grounding terminal with the object to be welded.

The magnet holder 6 mainly consists in two parts. A lower rectangular part with an upper rectangular compartment and a lower rectangular compartment where the magnets 11*a* and 11*b* can be accommodated, constituting respectively an upper permanent magnet 11*a* and a lower permanent magnet 11*b*. The second part of the magnet holder is an upper fixing part for fixing the magnet holder to the handle of the grounding terminal. The fixing part has on top form of two arrow-shaped fixing devices which can be pushed into complementary fixing openings in the handle 9, as it appears from FIGS. 1–4. The magnet holder 6 is made of heat resistant plastic and preferably molded in one piece. It is in the space defined by the steel plates 1, 2 and the spacing plate 3. as it clearly appears from the FIGS. 1–4. The magnet holder, and thereby the permanent magnets. can be moved in the longitudinal direction, that is parallel with the longitudinal direction of the steel plates, in this space by movement of the handle 9, 10. This will later be given a further explanation.

Figure 2:
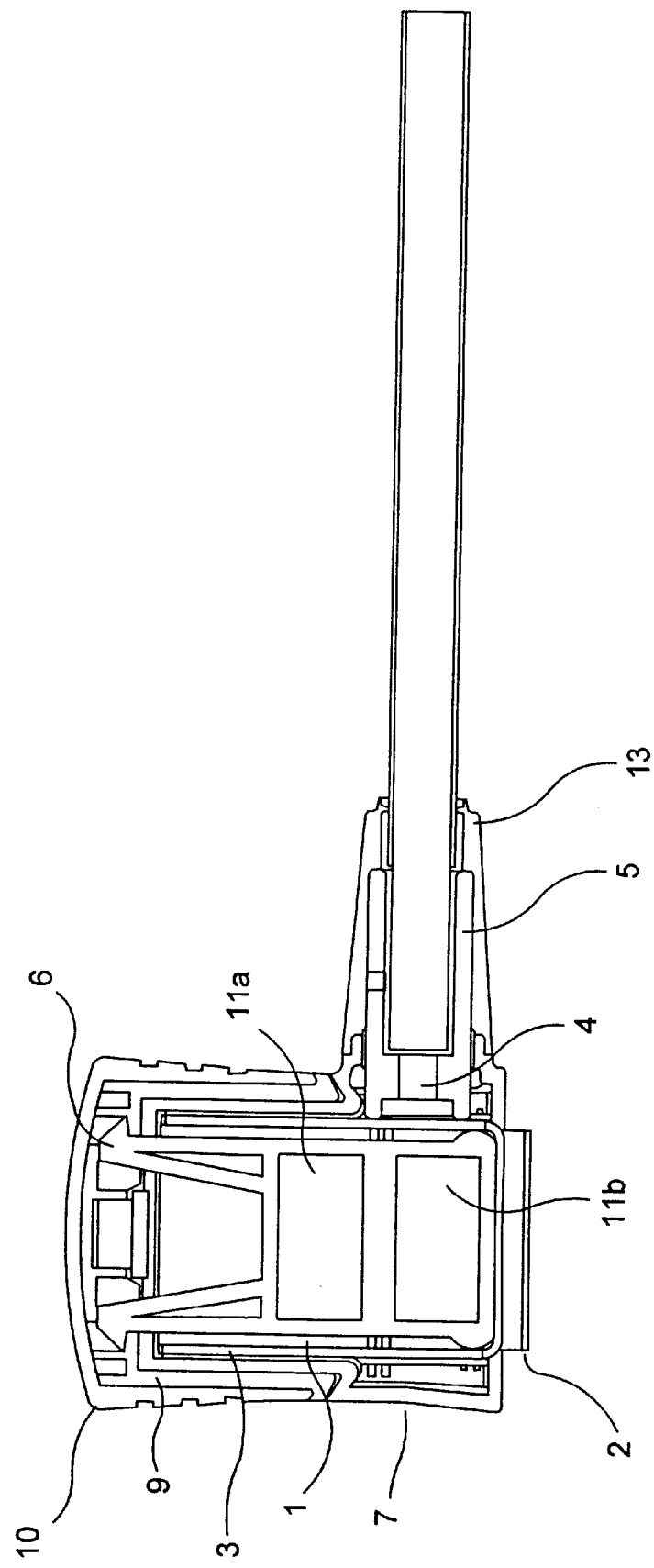
FIG. 2 shows a longitudinal section through the grounding terminal in FIG. 1.
Figure 4:
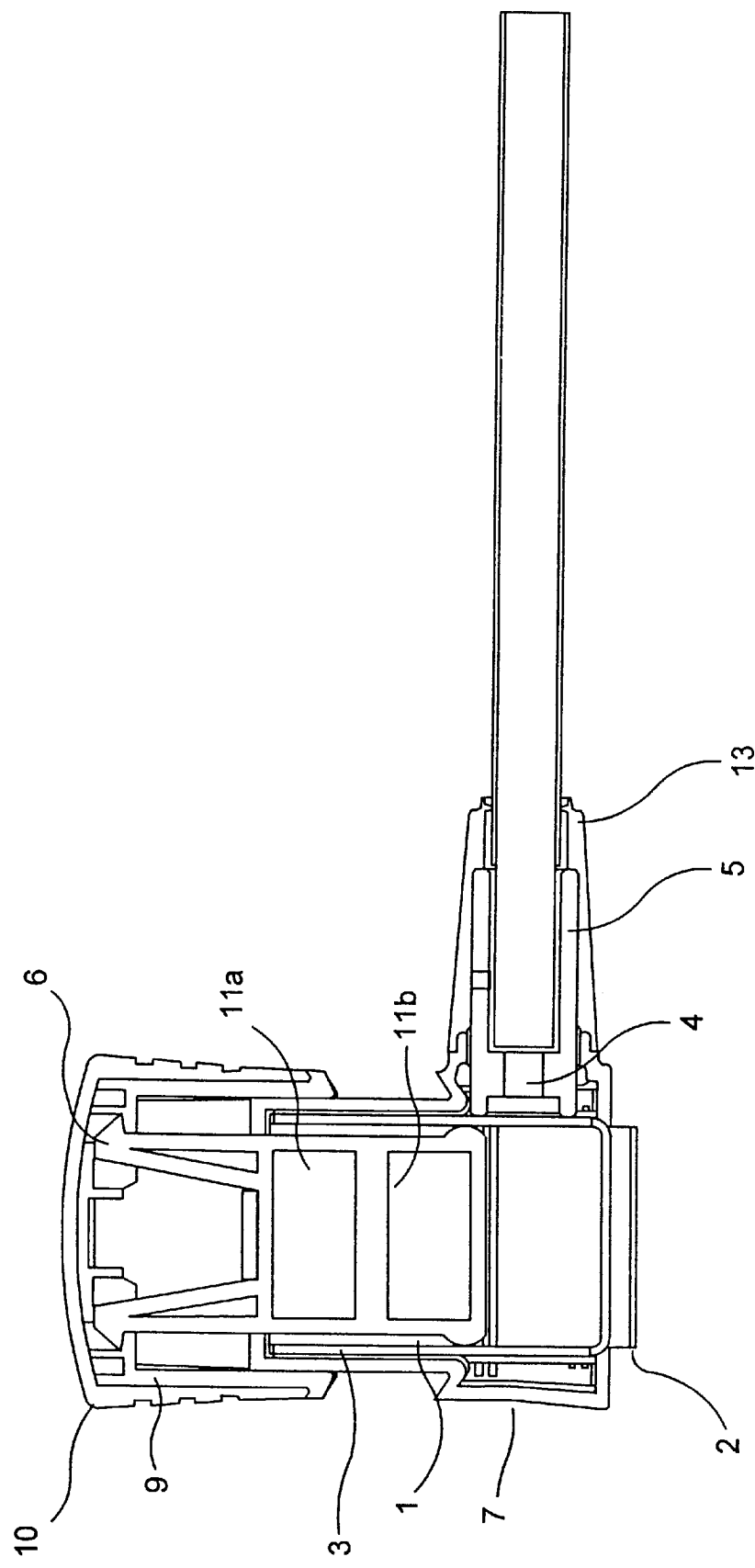
FIG. 4 shows a longitudinal section through the grounding terminal in FIG. 3.

As it appears from the FIGS. 2, 4 and 5 the noncorrosive boit 4 is in direct contact with one of the side walls 3b of the spacing plate 3. The spacing plate 3 is further in direct contact with the two upper and two lower steel plates 1 and 2. The electrical connection with the workpiece and the negative conductor (ground) is provided by the lower steel plates 2, which are in physical contact with the workpiece. When the grounding terminal is in the state for fastening to an object, as will be explained later, the terminal is very well fastened to the construction, and giving a good electrical contact between the grounding terminal and the construction, with little heating of the grounding terminal and minimal voltage drop over the terminal.

When the grounding terminal is in the state for fastening and is fastened to a 10 mm steel plate, it is needed under optimal conditions a load equivalent to 100 kg to disengage the grounding terminal from the steel plate.

Figure 6:
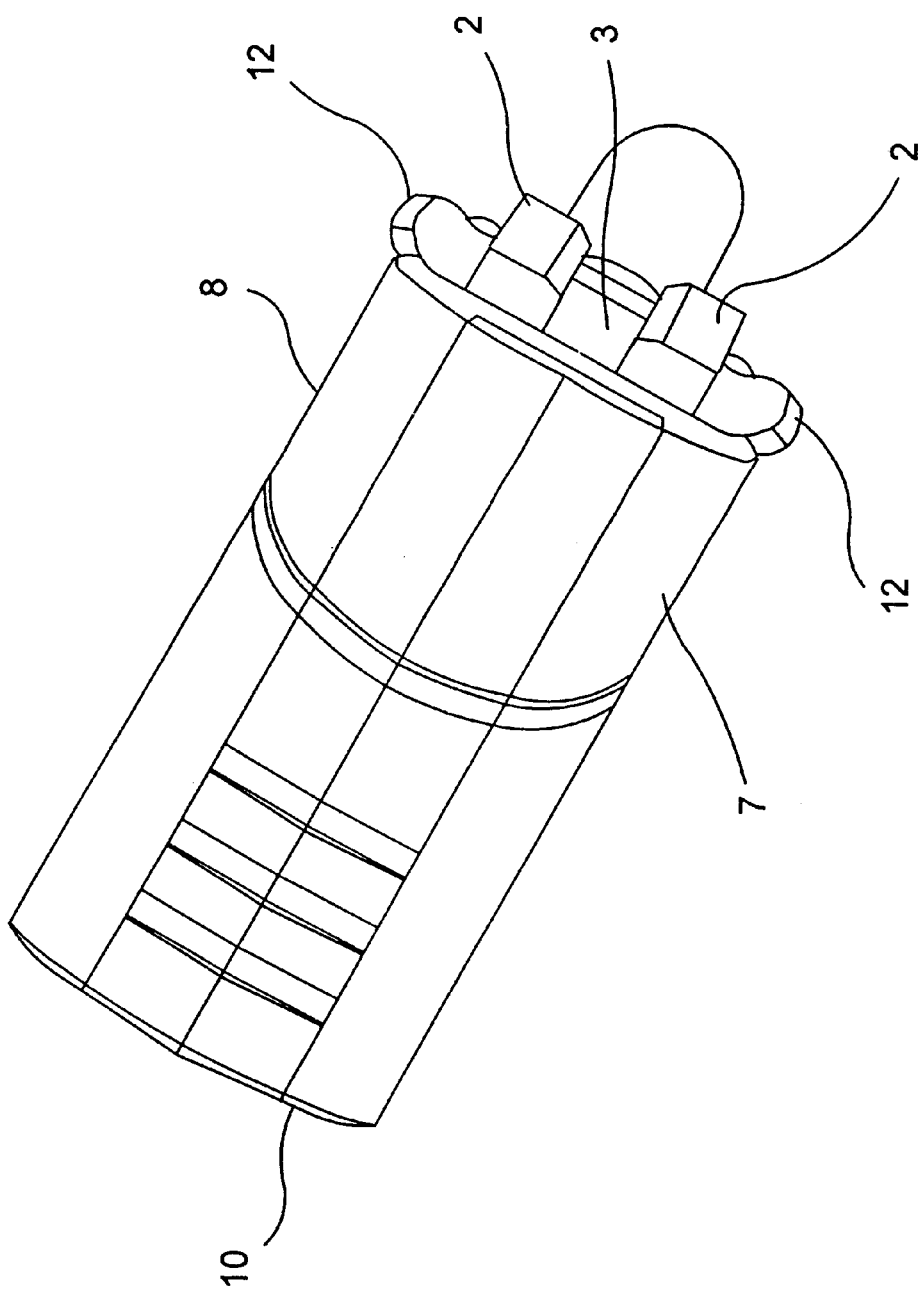
FIG. 6 shows an embodiment of the grounding terminal according to the is invention seen partly from the front and from the underside.

FIG. 6 shows the shape of the lower ends of the steel plates 2, which forms the contact surfaces with the object to be welded. The lower end faces of the steel plates 2 are planar, and the inside of the lower ends of the steel plates 2 have opposite slanting faces forming a groove. The slanting faces are preferably planar and slant upwards in a direction towards each other, and are milled out on the inside of the lower end faces of the lower steel plates 2. The special design of the slanting contact surfaces and the dimension of the grounding terminal, makes the grounding terminal especially suited for fastening on pipes and pipe constructions. The grounding terminal in itself is well suited for fastening on surfaces as the fastening is provided by magnetism, and the contact surfaces are then constituted by the end faces of the steel plates 2. The terminal can be fastened to ferromagnetic materials such as iron and steel.

The scraping tool consists in two scraping knives 12 of hardened steel, which are provided perpendicular protruding compared with and close to the contact surfaces of the grounding terminal, but so that Fe scraping tool does not influence the contact surfaces' contact with the workpiece. The scraping knives 12 are fixed to the inside of the lower parts of cover A and cover B respectively. From FIGS. 7 and 8 the placing of the scraping knives on the grounding terminal clearly appears.

Function

Figure 3:
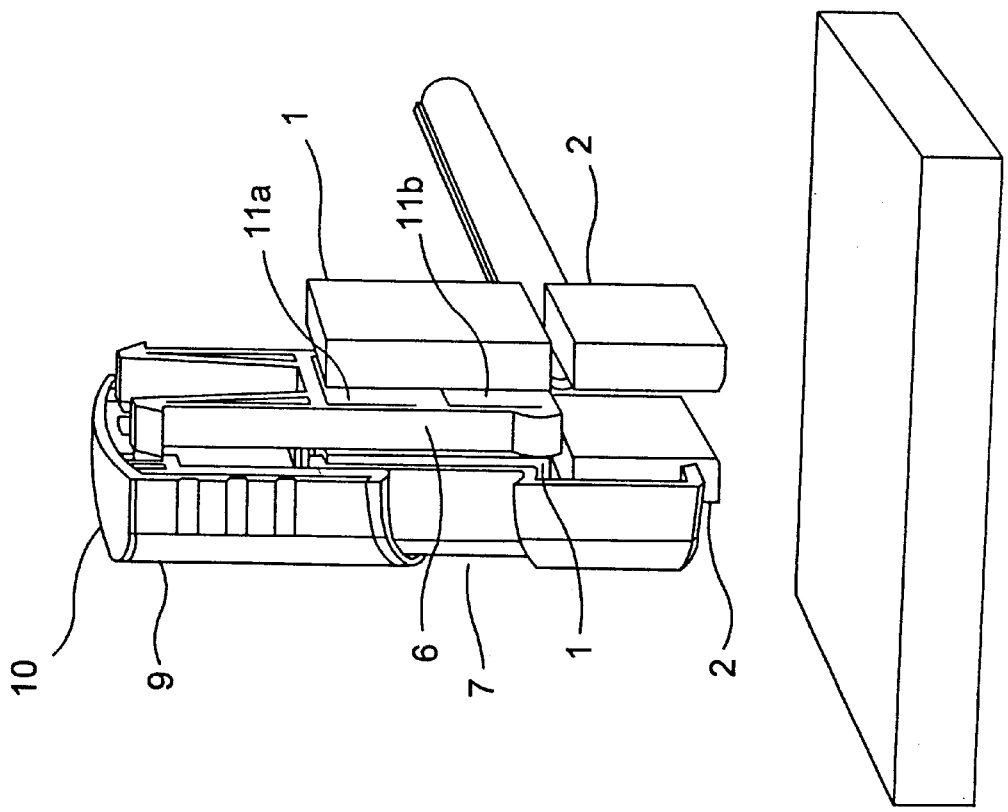
FIG. 3 shows the grounding terminal in FIG. 1 in a second state for unfastening the terminal from the construction.

In FIGS. 1 and 2 the permanent magnets of the grounding terminal are in a first state for fastening to a construction to be welded, while FIGS. 3 and 4 show the permanent magnets of the grounding terminal in a second state for unfastening the terminal from the construction. It can be seen from FIGS. 1 and 2 that when the permanent magnets are in the first state the lower permanent magnet 11b is accommodated between the two lower metal plates 2 and the upper permanent magnet 11a is accommodated between the two upper metal plates 1. When the permanent magnets are in the second state, the two permanent magnets 11a, 11b are accommodated between the two upper metal plates 1. In the second state the permanent magnets will, that are placed with the south pole on the upper magnet facing the north pole of the lower magnet, create magnetic field lines mainly in the upper steel plates; a so-called closed magnetic loop. Magnetic field lines will essentially not be created in the lower steel plates, and thereby there are no magnetic field lines emanating from the lower end faces of the lower steel plates. Therefore, magnetic forces will not be established between the contact surfaces and a workpiece. Possible metal shavings or other magnetic objects will neither be able to fasten on the grounding terminal when the permanent magnets are in the second state. When the permanent magnets are in the first state, the permanent magnets will create magnetic field lines extending through the upper and lower metal plates, where the field lines will emanate from the lower end faces. This is denoted an open magnetic loop. A magnetic field is created in the contact surfaces of the grounding terminal, and thereby magnetic forces for secure fastening of the grounding terminal to a construction to be welded. By movement of the magnet holder and thereby the permanent magnets between the two positions as explained above. the grounding terminal will easily be fastened to and unfastened from a construction.

As the upper part of the magnet holder 6 is fixed to the handle 9, movement of the handle 9 causes alteration of positions of the magnet holder 6 and thereby the position of the permanent magnets 11a, 11b. By fastening the terminal to a construction to be welded, the grounding terminal is held by one hand and pressed against the construction. This causes the magnet holder and thereby the permanent magnets, that initially are in the second position, to be moved to the first position, and a powerful magnetic field is established in the contact surface with the construction as explained above. The grounding terminal is thereby fastened to the construction. After welding, when the grounding terminal is unfastened from the construction. the handle, which is still held by the same one-hand-grip as by fastening, is pulled out from the surface of the construction. Thereby the magnet holder is moved, and thereby the permanent magnets, are moved to the second position with the result that the magnetic field in the contact surface disappears, and the terminal disengages from the construction.

As the scraping knives 12 are fixed close to the contact surfaces of the grounding terminal, rust, paint and oxide scale can be scraped off the construction before welding, so that a good electrical connection is obtained between the grounding terminal and the construction. During scraping the grounding terminal is also held by the same one-hand-grip as by fastening to and unfastening from the construction. This design of the grounding terminal assumes that scraping the fastening surface of the construction, fastening the grounding terminal to the construction and unfastening the grounding terminal from the construction can be performed in successive operations and by using the same one-hand-grip on the terminal.

What is claimed is:

1. A magnetic grounding terminal for temporary connection of a grounding conductor to an object to be welded, said grounding terminal comprising (a) permanent magnet means for attracting the object by magnetic force;
   (b) housing means for accommodating the magnet means in the grounding terminal in either of two states, a first state in which the magnet means are arranged so that the grounding terminal fastens to the object by magnetic force and a second state in which the magnet means are arranged so that the grounding terminal unfastens from the object; and
   (c) switching means for permitting the magnet means to be switched from the second state to the first state by pressing the grounding terminal against the object and from the first state to the second state by pulling the grounding terminal away from the object, said switching means being manipulable with one hand whereby the grounding terminal can be fastened to and unfastened from the object with one hand.

2. A magnetic grounding terminal according to claim 1, wherein the magnet means comprise a plurality of permanent magnets, said permanent magnets being moveable between a first and a second position, representing the first and second states of the magnet means.

3. A magnetic grounding terminal according to claim 2, wherein the housing means comprises a housing, and the switching means comprise two upper parallel extended metal plates and two lower parallel extended metal plates disposed in the housing, the permanent magnets being arranged between the metal plates and in the first position constituting an open magnetic loop together with the metal plates for fastening the grounding terminal to the object, and in the second position constituting a closed magnetic loop together with the metal plates for unfastening the grounding terminal from the object.

4. A magnetic grounding terminal according to claim 3 comprising a magnet holder arranged between the metal plates, the magnet holder having an upper and a lower compartment for mounting of the permanent magnets, said permanent magnets comprising an upper permanent magnet and a lower permanent magnet respectively.

5. A magnetic grounding terminal according to claim 4, wherein in the first position the lower permanent magnet is arranged between the two lower metal plates and the upper permanent magnet is arranged between the two upper metal plates, and in the second position the two permanent magnets are arranged between the two upper metal plates.

6. A magnetic grounding terminal according to claim 5, wherein the housing has a handle to which the upper compartment of the magnet holder is fixed, whereby movement of the handle causes alteration of the position of the magnet holder and thereby the permanent magnets.

7. A magnetic grounding terminal according to claim 3, wherein the lower metal plates comprise contact surfaces for contact with the object to be welded.

8. A magnetic grounding terminal according to claim 7, wherein the metal plates have a certain thickness providing defined end faces, wherein the contact surfaces are constituted by the lower end faces of the two lower metal plates, and by a groove formed by the insides of the lower ends of the two lower metal plates, the groove facilitating the fastening of the grounding terminal on pipes and pipe constructions.

9. A magnetic grounding terminal according to claim 8, wherein the insides of the lower ends of the lower metal plates have the form of opposite slanting faces, the faces slanting upwards in a direction towards each other.

10. A magnetic grounding terminal according to claim 1, wherein the magnet means comprise a plurality of permanent magnets made of Nd—Fe—B—35.

11. A magnetic grounding terminal according to claim 1 comprising scraping means for scraping off rust, paint or oxide scale from the object to obtain a better contact surface between the grounding terminal and the object.

12. A magnetic grounding terminal according to claim 11, wherein the scraping means comprises a plurality of scraping knives arranged for protruding perpendicularly outward from the contact surfaces without interfering with contact between the contact surfaces and with the object.

13. A magnetic grounding terminal according to claim 12, wherein the housing means, switching means and scraping means are disposed with respect to one another so that scraping off rust, paint and oxide scale on the object to be welded and fastening the grounding terminal to the object and unfastening the grounding terminal from the object, can be performed in successive operations by using one hand only and without changing a grip on the grounding terminal.

14. A magnetic grounding terminal according to claim 1, wherein the magnetic grounding terminal comprises a grounding conductor and a quick release coupling for the grounding conductor so that it can be easily disconnected from the grounding terminal.

* * * * *